(12) United States Patent
Skopec et al.

(10) Patent No.: US 7,305,410 B2
(45) Date of Patent: Dec. 4, 2007

(54) LOW-LATENCY METHOD TO REPLACE SQL INSERT FOR BULK DATA TRANSFER TO RELATIONAL DATABASE

(75) Inventors: Michael Skopec, Montgomery, IL (US); Paul Bartholf, Joliet, IL (US)

(73) Assignee: Rocket Software, Inc., Newton, MA (US)

( * ) Notice: Subject to any disclaimer, the term of this patent is extended or adjusted under 35 U.S.C. 154(b) by 446 days.

(21) Appl. No.: 10/735,533

(22) Filed: Dec. 12, 2003

(65) Prior Publication Data

US 2004/0128299 A1 Jul. 1, 2004

Related U.S. Application Data

(60) Provisional application No. 60/436,549, filed on Dec. 26, 2002.

(51) Int. Cl.
*G06F 17/00* (2006.01)

(52) U.S. Cl. ............... 707/102; 707/3; 707/104.1

(58) Field of Classification Search ............... 707/100, 707/1–3, 104.1, 102; 709/205, 232
See application file for complete search history.

(56) References Cited

U.S. PATENT DOCUMENTS

| | | | | |
|---|---|---|---|---|
| 4,506,326 | A | | 3/1985 | Shaw et al. ............... 364/300 |
| 5,280,583 | A | * | 1/1994 | Nakayama et al. ......... 709/205 |
| 5,642,505 | A | | 6/1997 | Fushimi ..................... 395/620 |
| 5,644,763 | A | | 7/1997 | Roy ........................... 395/612 |
| 5,706,494 | A | * | 1/1998 | Cochrane et al. ............. 707/2 |
| 5,842,196 | A | | 11/1998 | Agarwal et al. ............... 707/2 |
| 5,873,075 | A | | 2/1999 | Cochrane et al. ............. 707/2 |
| 5,956,706 | A | | 9/1999 | Carey et al. .................. 707/2 |
| 5,974,407 | A | | 10/1999 | Sacks .......................... 707/2 |
| 6,029,163 | A | | 2/2000 | Ziauddin ...................... 707/2 |
| 6,219,660 | B1 | | 4/2001 | Haderle et al. ............... 707/1 |
| 6,353,833 | B1 | | 3/2002 | Bird et al. .................. 707/201 |
| 6,385,604 | B1 | | 5/2002 | Bakalash et al. ............. 707/3 |
| 6,421,658 | B1 | | 7/2002 | Carey et al. .................. 707/2 |
| 6,427,143 | B1 | | 7/2002 | Isip, Jr. et al. ............... 707/1 |
| 6,438,536 | B1 | | 8/2002 | Edwards et al. ............. 707/2 |
| 6,442,543 | B1 | | 8/2002 | Snodgrass et al. ............ 707/3 |
| 6,453,314 | B1 | * | 9/2002 | Chan et al. .................. 707/3 |
| 6,456,995 | B1 | | 9/2002 | Salo et al. .................... 707/1 |
| 6,470,354 | B1 | | 10/2002 | Aldridge et al. ......... 707/103.4 |
| 6,735,597 | B1 | * | 5/2004 | Paradies .................... 707/102 |
| 2002/0052868 | A1 | | 5/2002 | Mohindra et al. ............ 707/1 |

(Continued)

*Primary Examiner*—Sathyanarayan Pannala
(74) *Attorney, Agent, or Firm*—Barlow, Josephs & Holmes, Ltd

(57) ABSTRACT

The invention is generally directed to a method for efficiently loading bulk data into a relational database with reduced load time. A database with record data loaded therein is provided in a computer's main memory. A coordinating program is invoked as well as a standard load utility program that issues record data input requests, opens record data from external media and loads record data to the database therefrom. With the coordinating program record data input requests made by the load utility from external media are intercepted. Record data input requests from external media are replaced with record data input requests from the computer's main memory. Record data from the computer's main memory is inserted directly into the database by the load utility. As a result, delays encountered by reading of input files on the external media by the load utility are avoided thereby freeing up computer resources.

6 Claims, 7 Drawing Sheets

U.S. PATENT DOCUMENTS

| | | | |
|---|---|---|---|
| 2002/0073089 A1 | 6/2002 | Schwartz | 707/10 |
| 2002/0129035 A1 | 9/2002 | Hayes et al. | 707/104.1 |
| 2002/0174103 A1 | 11/2002 | Hsiao et al. | 707/1 |
| 2003/0154098 A1* | 8/2003 | Kalnas et al. | 705/1 |
| 2004/0225745 A1* | 11/2004 | Carroll et al. | 709/231 |

* cited by examiner

LOW-LATENCY METHOD TO REPLACE SQL INSERT FOR BULK DATA TRANSFER TO RELATIONAL DATABASE

CROSS-REFERENCE TO RELATED APPLICATIONS

This application claims priority from prior U.S. Provisional Application Ser. No. 60/436,549, filed on Dec. 26, 2002.

BACKGROUND OF THE INVENTION

This invention relates generally to a relational database management system (RDBMS). More specifically, the present invention relates to a system and method for the efficient bulk transfer of data into a relational database where in the input data is already in a computer's main memory.

A RDBMS is a computer database management system that uses relational techniques for storing and retrieving data. Relational databases are computerized information storage and retrieval systems in which data in the form of tables (formally, "relations") are typically stored for use on disk drives or similar mass data stores. A "relation" includes a set of rows (formally, "tuples" or "records") spanning several columns (formally, "attributes"). A "tuple" expresses a mathematical relation between its "attributes" (column elements), while a "record" does not. Reference is made to C. J. Date, An Introduction to Database Systems, 6th Ed., Addison-Wesley, Reading, M. A. (1994) for general treatment of the relational database art.

A well known database software program is DATABASE 2 (DB2) database software distributed by IBM Corporation. As is known in the art, DB2 operates as a subsystem in a computer system operating under the IBM MVS operating system software. In a DB2 environment, user data resides in DB2 tables with rows and columns, as described above. DB2 can manage multiple concurrent requests to manipulate the same table at the same time by tracking SQL read and write requests, and acquiring and releasing resource locks.

A RDBMS is structured to accept commands to store, retrieve and delete data using high-level query languages such as the structured query language, known as SQL. Standard SQL statements can be used to accomplish extensive database management operations across various platforms of currently available commercial database management systems. The SQL standard has been promulgated by the International Standards Association since 1986. Reference is made, for example, to the SQL-92 Standard "Database Language SQL" published by the ANSI as ANSI X3.135-1992 and published by the ISO as ISO/IEC 9075: 1992 for the official specification of the 1992 version of the Structured Query Language. SQL is the widely accepted language and interface to access relational databases, namely to define the database objects, to manipulate the data in the database objects, and to control access to the database objects. For example, these SQL statements or commands may be utilized to perform database management tasks such as the retrieval of data from a database and updating data in a database.

For example, SQL "query" statements refers to a set of user commands for retrieving data from a stored database. SQL is used to communicate queries to an RDBMS. SQL requires the return of a particular result set in response to a particular query, but the method of query execution ("Query Execution Plan") employed by the RDBMS is not specified by the query. There are typically many different useful execution plans for any particular query, each of which returns the required result set. For large databases, the execution plan executed by the RDBMS to execute a query must provide the required data return at a reasonable cost and time and hardware resource. Almost all RDBMSs include a query optimizer to translate queries into an efficiently executable plan. Queries are submitted by users of the RDBMS.

Also, the database management task of loading data into a relational database, such as for adding and/or updating records, is of critical importance. There are two known methods of loading data into a relational database.

First, it has been well known in the prior art to command an application program to invoke an SQL INSERT statement which transfers one row of application data into a database table. The data is first transferred into variables or into memory structures before being loaded, i.e. "inserted" into the table. The SQL INSERT statements incurs overhead for the RDBMS because it must first log the changes made to the tables and then set up and communicate the SQL INSERT call to the relational database management system. Also, further overhead is incurred because the SQL INSERT command requires the RDBMS to manage concurrency by acquiring and releasing locks on the tablespace. The overhead from SQL INSERT statements can be considerable. For example, an application program that is inserting millions of records into a table can cause the DB2 system to perform corresponding millions of input/output I/Os required to load the data into the table initially. This requires a proportional number of log and space updates. In addition, referential integrity checks, indexing and logging of all of the changes incurs even further overhead. Therefore, each I/O can take a significant amount of time to load a large number of records using an application program. In tuning performance of any computer program, including an application program, the variables involved in achieving optimal performance include instruction path length (e.g., the number of instructions), memory (e.g., address space) and number of I/Os.

Secondly, it has also been known in the prior art to use a load utility to manage and control the loading of data into a relational database. This alternative method allows a program (herein termed the "load utility") to take input data and insert it directly into the underlying structures that represent the tables within the relational database. This method can allow the invoker of the load utility to turn off logging and also to issue a replace operation of an entire table without having to first perform the deletion of the existing data. Such an operation with SQL INSERT calls can require a series of SQL DELETE calls prior to loading the new data. However, a single mass DELETE call is commonly used which suffers from logging and locking escalations which are proportional to the number of I/O operations.

Such use of a load utility requires the application to write data to a storage media that is subsequently used as input to the load utility. External media, such as an intermediate file, hard disk or tape, must be accessible to provide the input to the load utility. For the purposes of this discussion, any storage medium or media other than the computer's main memory is considered herein to be "external media". As can be understood, this requires additional computer resources in the form the additional disk space, tape volumes or other type of external computer media. The use of a load utility further suffers from disadvantage of slowing down the bulk data transfer process because additional time is required for the application to write data to the intermediate file on the external media and for the load utility to subsequently read it.

In the prior art, query monitoring software is available that can collect statistics on each SQL statement executed for a given DB2 subsystem that is being monitored. These statistics are initially stored in several dataspaces, which are main memory areas that can only contain data and not programs. At the end of a timed interval or at the user's request, the dataspaces are transferred to DB2 tables. For long intervals or frequently accessed tables, this could result in the addition of several million rows to the database tables. Using SQL INSERT to add the statistics to the table could frequently require more elapsed time, CPU time or resource locks than allowed by the environment.

In view of the foregoing, there is a demand for a more efficient method to load large quantities of data into a database that is already contained in a computer's main memory. There is also a demand to reduce the elapsed time and CPU time used when adding bulk data to relational database tables. There also is a need to minimize the number of resources used when adding bulk data to relational database tables. There is a further demand to eliminate the need for additional input files on external media when the data is already contained in memory.

SUMMARY OF THE INVENTION

The present invention preserves the advantages of prior art methods for bulk data transfer to a relational database. In addition, it provides new advantages not found in currently available methods and overcomes many disadvantages of such currently available methods.

The invention is generally directed to a novel and unique method for loading bulk data into a relational database. A database with record data loaded therein is provided in a computer's main memory. A coordinating program in invoked as well as a standard load utility program that issues record data input requests, opens record data from external media and loads record data to the database therefrom. By use of the coordinating program, record data input requests, which are made by the load utility from external media, are intercepted. Record data input requests from external media are replaced with record data input requests from the computer's main memory. Record data from the computer's main memory is inserted directly into the database by the load utility. As a result, delays encountered by reading of input files on the external media by the load utility is avoided thereby making the bulk loading of data into a database more efficient by reducing load time and freeing up computer resources.

As will be described in detail below, the coordinating program intercepts read requests issued by the load utility for the intermediate input files thereby significantly reducing the time required to load data into the relational database without incurring additional computer resources needed for input.

The load utility is preferably invoked by an application program and fed the application data directly from main memory instead of an external computer medium. Locks are never required to delete the existing rows in any table or for inserting individual rows.

It is therefore an object of the present invention to provide an efficient method to load large quantities of data that is already contained in a computer's main memory. It is a further object of the present invention to reduce the elapsed time and CPU time used when adding bulk data to relational database tables. Another object of the present invention is to minimize the number of resources used when adding bulk data to relational database tables. Yet another object of the invention is to eliminate the need for additional input files on external media when the data is already contained in memory.

BRIEF DESCRIPTION OF THE DRAWINGS

The novel features which are characteristic of the present invention are set forth in the appended claims. However, the invention's preferred embodiments, together with further objects and attendant advantages, will be best understood by reference to the following detailed description taken in connection with the accompanying drawings in which:

DETAILED DESCRIPTION OF THE PREFERRED EMBODIMENT

Figure 9:
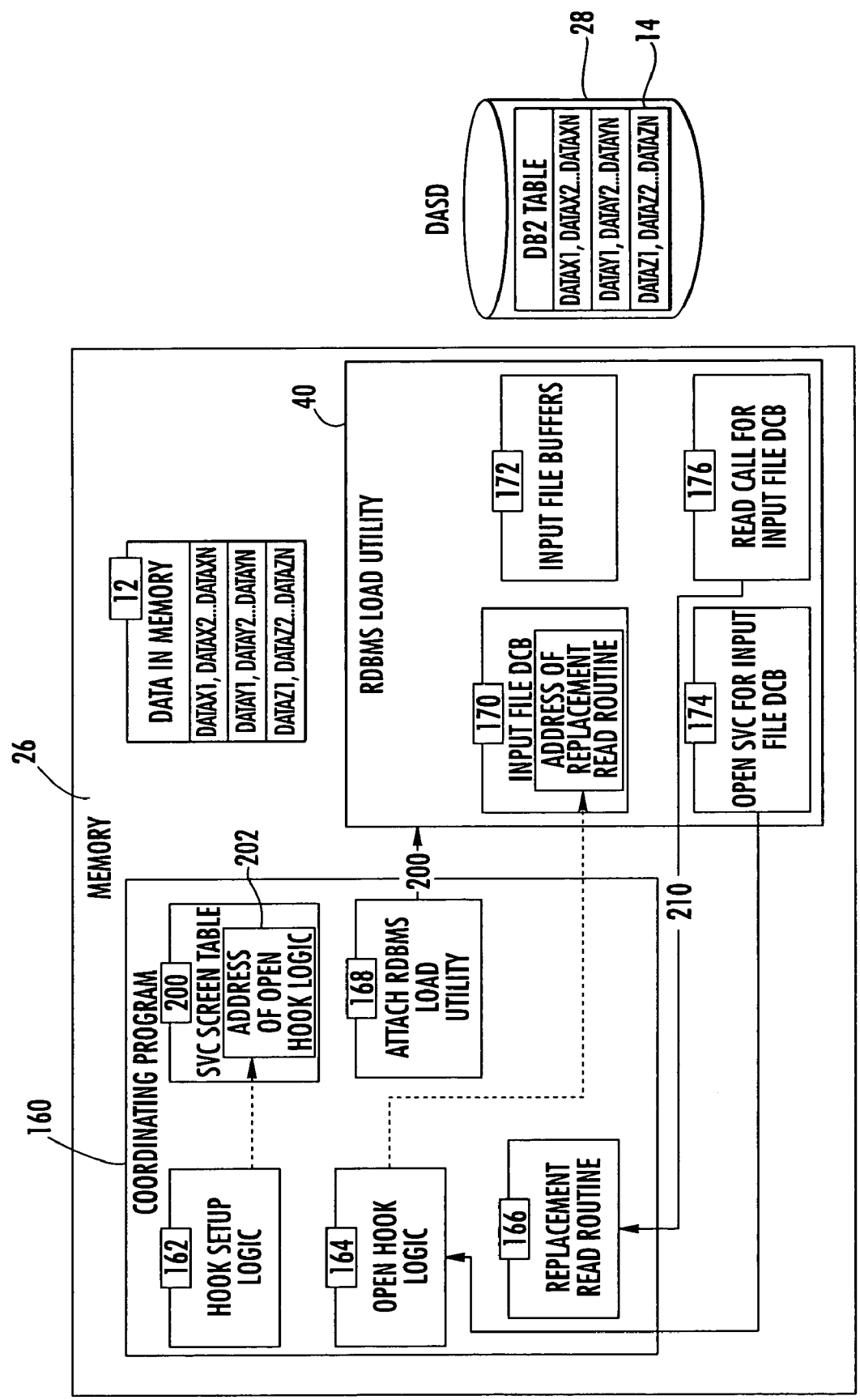
FIG. 9 is flowchart of illustrating the interrelationship between the various routines and utilities carried out in accordance with the method of the present invention.

The present invention generally provides for the use of a coordinating program, generally shown as 160 in FIG. 9, to intercept calls from a load utility so that application data is loaded into the database directly from a computer's main memory rather than from external media which is typically the source of input files for a load utility.

Figure 1:
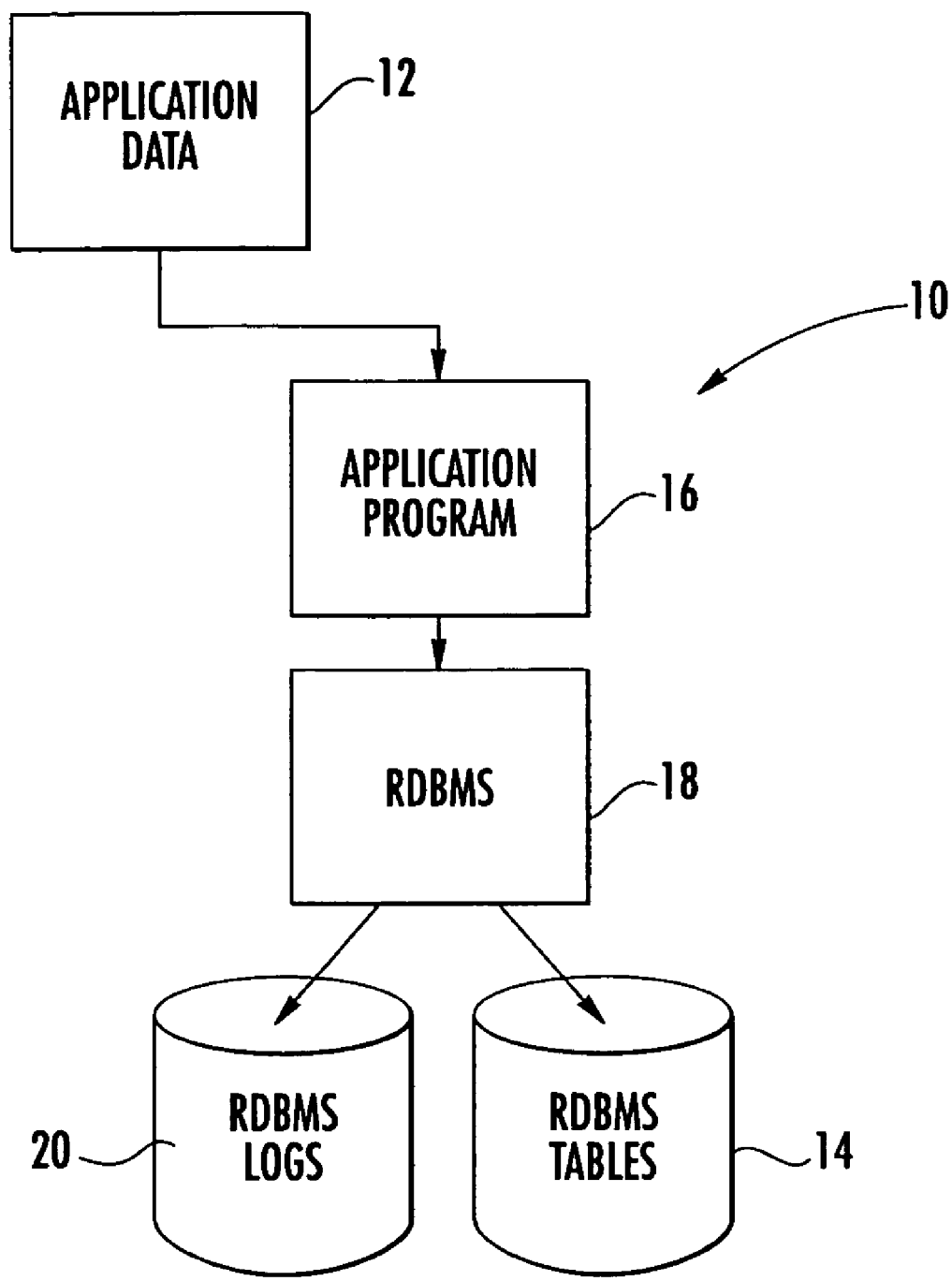
FIG. 1 is a flowchart of a prior art method of loading data into a database using the SQL INSERT statement.

As stated above, there are two generally known methods for loading data into a database. First, the use of RDBMS SQL "INSERT" calls are commonly used for the purpose of loading tables. As seen in FIG. 1, a flowchart of the process of executing an SQL statement is generally shown as 10. An SQL INSERT statement transfers one row of application data 12 into a database table 14 via the application program 16 itself and the RDBMS 18. The data is first transferred into variables or into memory structures before being loaded (INSERT) into the tables 14. The SQL INSERT statements incurs overhead for the RDBMS 18 because it also writes RDBMS logs 20 containing the changes made to the tables 14 and then sets up and communicates the SQL INSERT call to the RDBMS 18. As stated above, computer overhead is significantly increased when using the SQL INSERT call.

Figure 2:
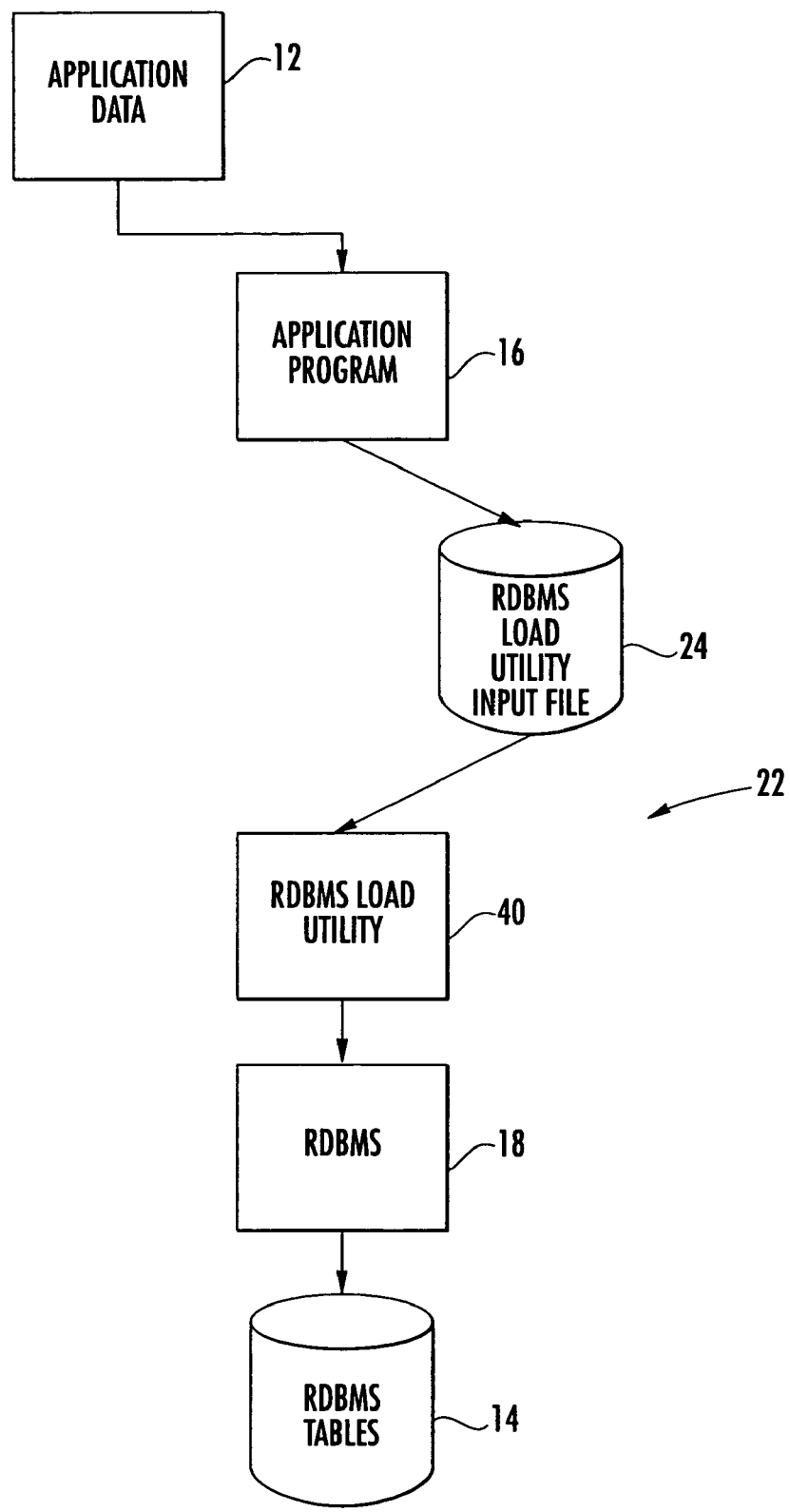
FIG. 2 is a flowchart of a prior art method of loading data into a database using a load utility.
Figure 3:
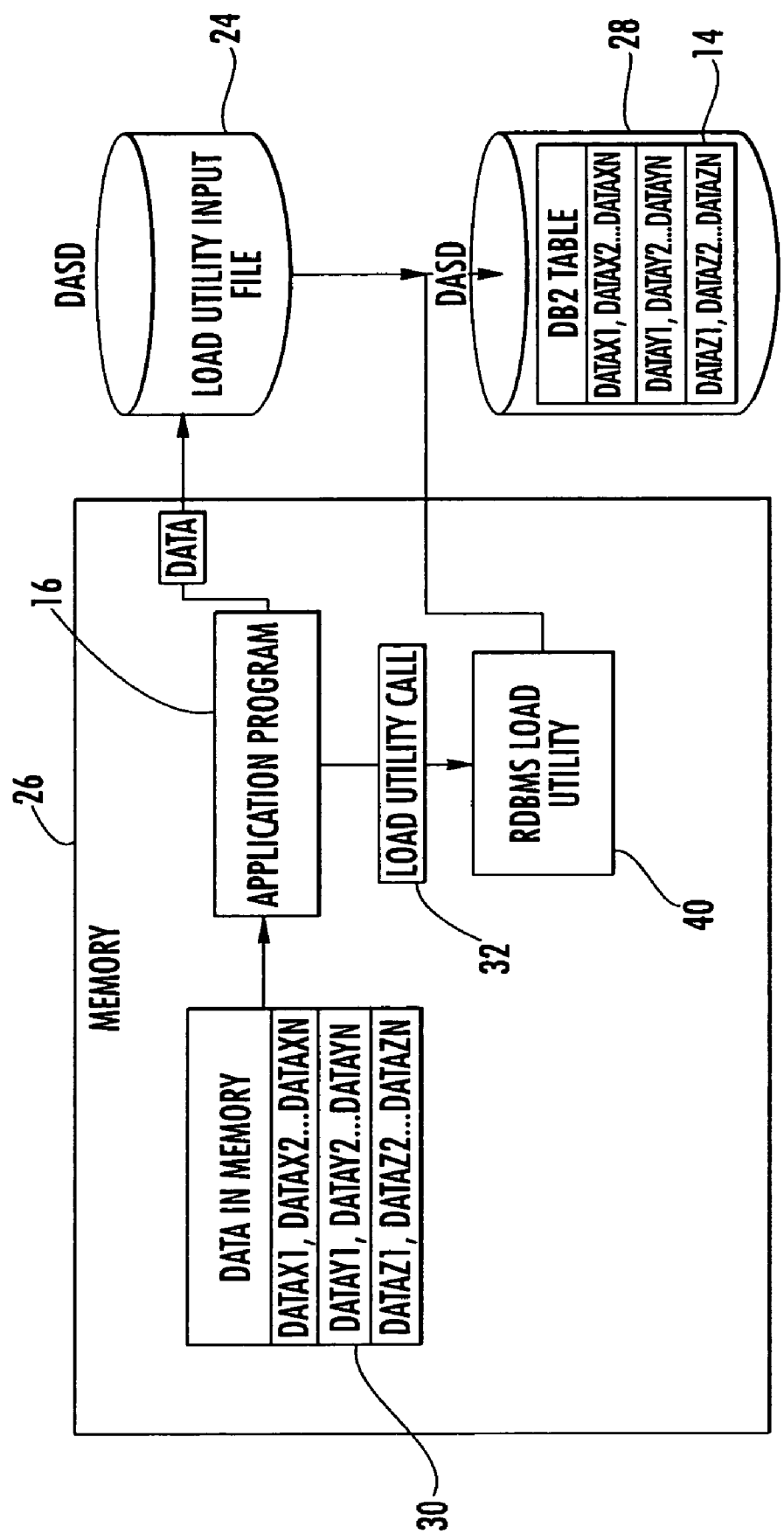
FIG. 3 is a graphical representation of a prior art method of loading data into a database using the load utility of FIG. 2.

FIGS. 2 and 3 illustrate a prior art method for loading new data 30 into a database using a load utility 40, such as the LOAD utility provided by IBM Corporation. Application data 12 residing in the computer's memory 26, for an application program 16, to be loaded into a table 14 of a database, is copied or moved to an input file 24 which is located on a external input media 28 upon a load utility call 32. The external media is also known as a DASD (direct access storage device). The input file 24 is read by the RDBMS load utility 40 and then written into the RDBMS tablespace 14 via the RDBMS 18.

Figure 4:
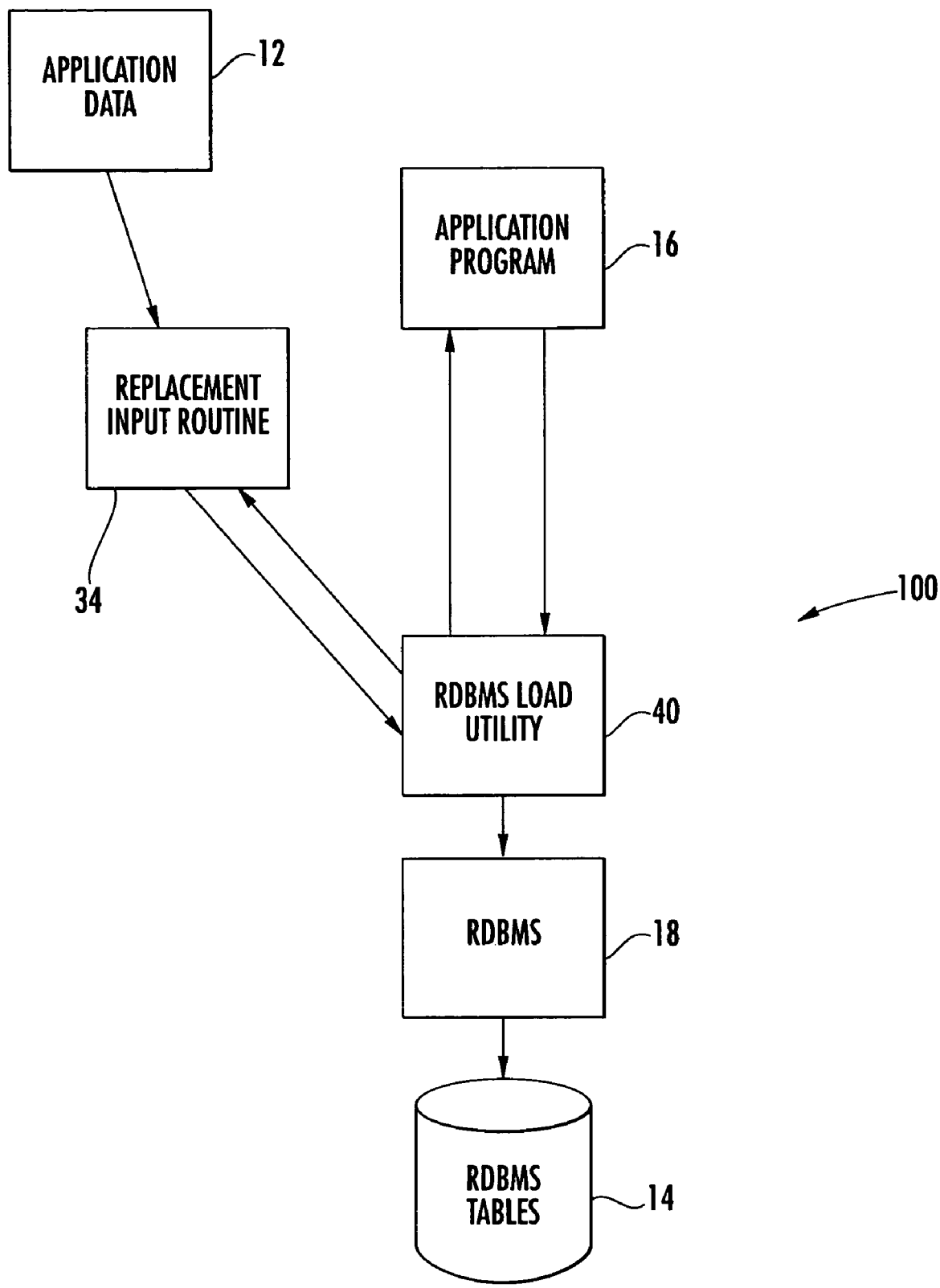
FIG. 4 is a flowchart of a method of loading data into a database using the method of the present invention with a replacement input routine.
Figures 5, 6:
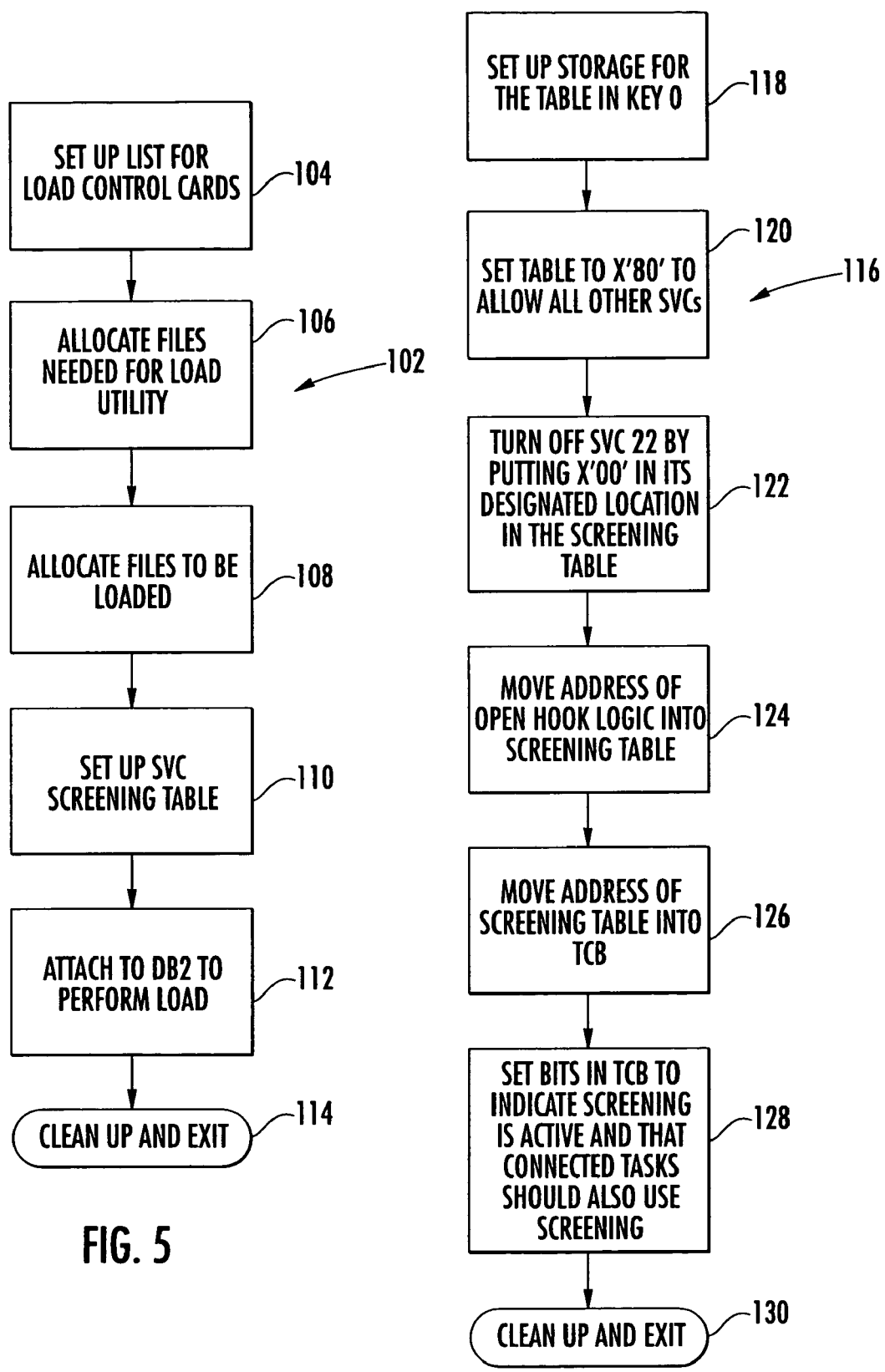
FIG. 5 is a flowchart of the Hook Setup routine in accordance with the method of the present invention.
FIG. 6 is a flowchart of the screening table process in accordance with the method of the present invention.

Turning now to FIG. 4, a flowchart of the method 100 of the present invention is shown. In accordance with the present invention, input calls from the load utility 40 are intercepted in a manner that is transparent to the load utility 40. Application data 12 is provided in a computer's main memory 26, as seen generally in FIG. 3. A coordinating program 160 is invoked as well as a load utility program 40. With the coordinating program 160. record data input requests made by the load utility 40 from external media (as in prior art FIG. 3) are intercepted. Record data input requests from external media are replaced with record data input requests from the computer's main memory by the operating system thereby providing a replacement input routine 34. Application data 12, for an application program 16, residing in a computer's main memory 26 (as seen in FIG. 6, below) is inserted directly into the RDBMS tables 14 by the load utility 40 via RDBMS 18. As a result, delays encountered by reading of input files on the external media by the load utility 40 is avoided thereby making the bulk loading of data into a database more efficient by reducing load time and freeing up computer resources.

Thus, in accordance with the present invention, read requests from the load utility 40 are satisfied directly from application memory 26 via the replacement input routine 34. The replacement input routine 34 is used in place of the routine provided by the operating system which undesirably writes the LOAD input utility file 24 to external media.

In FIGS. 5-9, details of the novel method 100 of loading application data is shown and described. In FIG. 5, a flowchart of the initial routine 102, hereafter called the "hook setup routine," is illustrated. This hook setup routine 102 is executed in accordance with the preferred embodiment 100 of the present invention. The routine 102 sets up a list 104 for providing input to the LOAD utility. Then in step 106, the files required by the DB2 LOAD utility 40 are allocated. In step 108, the files to be loaded and the SYSIN dataset, which provides the input for the LOAD utility 40, are allocated. The preceding steps are employed for invoking the DB2 LOAD utility 40 to carry out the method 100 of the present invention.

Sample code for checking SYSIN is shown below:

---
CHECK SYSIN (marginal relevance)

Establish addressability
Set key = 0
If (not end of file)
    Read card, put in buffer
    Point to next buffer
Set key = Zero
If (end of data)
Do end of data routine for DCB

---

Also, sample code for the hook setup routine of FIG. 5 is shown below:

Sample Hook Setup Routine
LOAD_DATA_INTO_DB2 (the hook setup routine)
Set up LOAD control cards
ALLOCATE_DSN_LOADS
LOAD_ALLOCATE_SVC99 for SYSIN card (dynamic allocation of the SYSIN DD)
LOAD_ALLOCATE_SVC99 for the 5 tables (dyn alloc of the 5 table dds)
Format some utility parms to give the utility an ID
Update the TCB to set mode to supervisor, key 0
LOAD_SCREEN_SVC22
    Establish addressability to the task control block.
    Get some storage in key 0. Because the SVC screening table is required to be in an area of storage that is agreeable to DB2, and DB2 operates in key 7. Application programs usually operate in key 8. Key 7 can't access Key 8. So we need to get some storage in key 0, which is accessible by all programs.
    Copy the update section of the hook code to key 0.
    Get more key 0 storage for the SVC screen table.
    Initialize the table storage to binary 0s.
    Set up the SVC screening table:
        Set all bytes to x'80' to turn on all SVCs
        Set byte for SVC 22 to '00' to intercept OPEN TYPE=J
        Move address of the key 0 hook code into the SVC screening table. This is what will be called when DB2 issues an SVC 22.
        Store the SVC screening table address in the task control block.
        Set 2 flags in the TCB to signify: 1) Screening is active and 2) any tasks that attach to this one should also use the screening table.
OPEN DSNLOAD (opens the DD for the DB2 LOAD library)
Attach to DB2 (invoke the load utility)
CLOSE DSNLOAD (Close the steplib)
LOAD_RELEASE_SVC22
Change mode back to previous nonzero key
Set return code
Exit Still referring to FIG. 5, step 110 calls a subroutine that sets up an SVC screening table 200, as seen in FIG. 9. This table 200 is an MVS device that tells the operating system ("OS") to bypass its own supervisor call routines and gives the operating system the address of replacement routine 34, as generally shown in FIG. 4. Before calling the subroutine 110, the program sets a PSW ("program status word") key to 0, switching to supervisor mode so that the program can access storage that it would not otherwise be able to.

After the SVC screening table 200 has been set up in step 110, the program attaches to DB2 to perform the LOAD in step 112. In step 114, the hook setup routine 102 performs some cleanup, such as releasing storage and closing datasets, and exits. Details of the screening table process 116 are shown in detail in FIG. 6. the SVC screening table setup begins with step 118 by configuring storage for the table in PSW key 0 so that the LOAD utility 40 can access it. In step 120, the table is initialized to hexadecimal '80's, which tells the OS that all other SVC calls are allowed. In step 122, the data area that represents SVC 22 (OPEN TYPE=J) in the screening table 200 is changed to hex '00' to indicate to the OS that a normal SVC 22 should not be used. Next, in step 124, the address of a replacement read (check) routine that reads the data from memory rather than from disk is inserted into the header of the screening table 200. This step tells the OS where to locate the new routine. In step 126, the address of the screening table 200 is then moved into the current TCB (Task Control Block) so the task can locate the screening table 200. In step 128, two bits are set in the TCB. The first bit turns on screening; this tells the task that whenever an SVC is issued, it should check the SVC screening table 200 to see if it needs to use a replacement routine 34. The second bit tells the OS that any tasks that connect to this task should also use the screening table 200. This allows the DB2 LOAD utility 40 to use the screening table 200 after it attaches to the coordinating program 160. Some routine cleanup is done in step 130, and the routine exits.

Figures 7, 8:
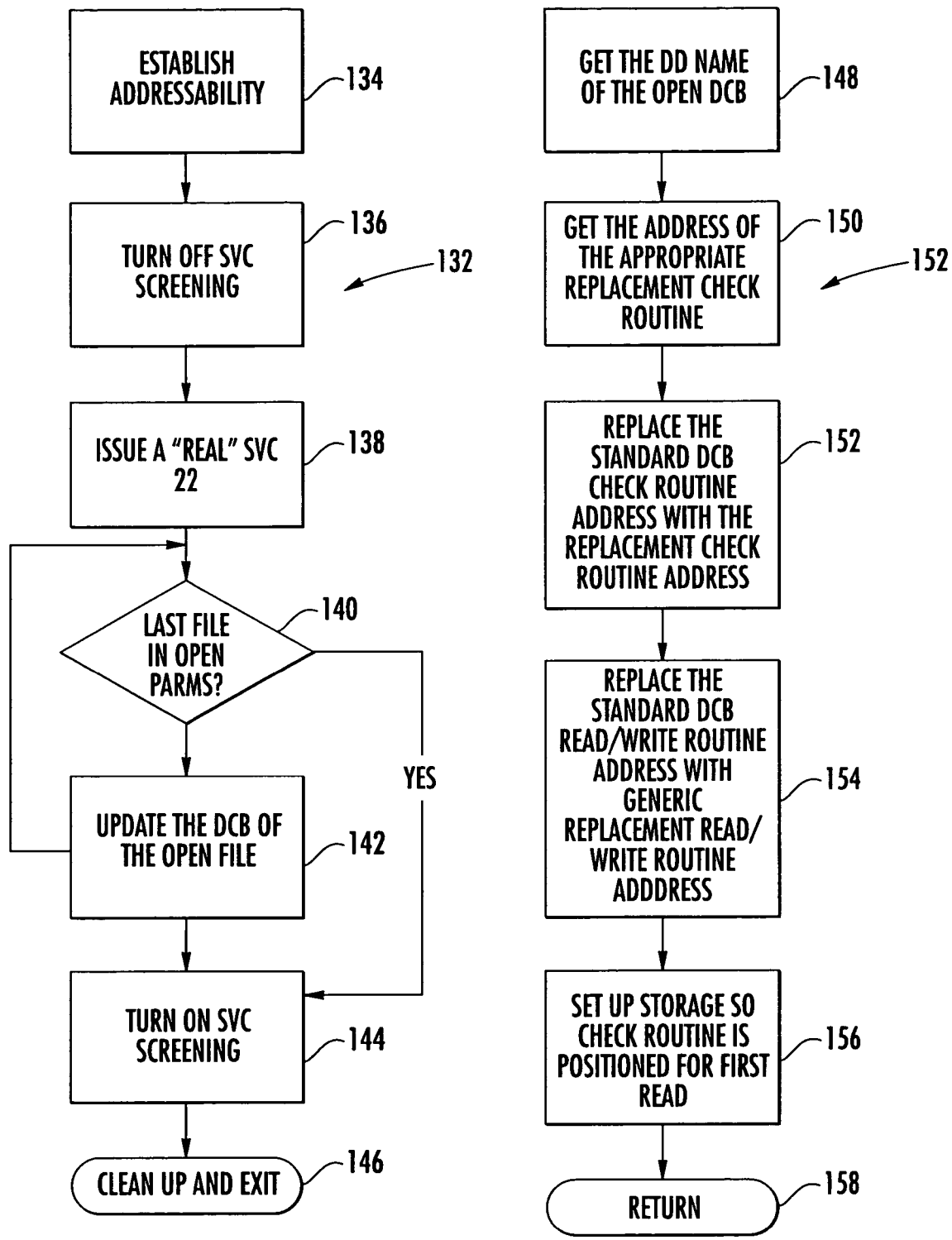
FIG. 7 is a flowchart of the Open Hook routine in accordance with the method of the present invention.
FIG. 8 is a flowchart of the details of the Open Hook routine of FIG. 7.

FIG. 7 illustrates a flowchart of the Open Hook routine 132. This routine 132 is called when MVS issues an SVC 22, which is an open that allows authorized access. The task calls the open hook logic 202, in FIG. 9, using the address that was placed into it during the SVC screen table setup. In step 134, addressability is established. Next, SVC screening is turned off, in step 136, because the Open Hook routine 132 needs to issue a "real" SVC 22 to open the requested files. In step 138, the program switches to the PSW key of the OPEN, issues the SVC 22 to open the requested DCB (Data Control Block), then switches back to PSW key 0. Thus, in step 140, the program check the open parameter list for an open DCB. Step 142 calls the subroutine that updates the input DCB with the replacement read and check routines. Step 144 turns SVC screening on, and in step 146 the routine exits. Therefore, DB2's call to SVC 22 must be intercepted so the coordinating program 160 may execute its own routine. To do that, the setup hook code must put in place a screening table 200, get the address of the update code in key 0, put it in the screening table 200 and tell the task to look at the screening table 200. Then, the hook code updates all the DCBs to be opened with the replacement routine 34.

Sample code for the Open Hook routine 132 of FIG. 7 is shown below:

WDB2LOAD (CSECT)—Sample Open Hook Routine
Establish addressability
Turn off SVC screening
Establish environment prior to open—including setting back to the key of a "real" open statement (SVC 22)
Issue the "real" SVC 22
Switch back to key 0
Re-establish addressability to the controlling program environment
For each input file of Step 108:
   UPDATE_OPEN_DCB
Turn on SVC screening FIG. 8 shows details of the Open Hook routine, of FIG. 7, namely a subroutine that updates the open DCB. The DCB must be updated to tell the OS the address of the replacement I/O routines. In the DB2's case, the read routine and the check routine must both be updated. Step 148 gets the DD (Data Definition) name of the open DCB for comparison. In step 150, the routine gets the address of the appropriate replacement check routine associated with the DD name. In step 152, this address is stored in the location where z/OS retrieves the check routine address when the read for the LOAD utility is accomplished. In step 154, the routine gets the address of a special replacement read routine that replaces the standard DCB read routine and places it in the location to be accessed by the LOAD utility 40. Finally, in step 156, the program sets up storage so that the check routine is positioned for the first read, and the subroutine returns in step 158.

FIG. 9 spatially illustrates the interrelationship between the various routines and utilities carried out in accordance with the method 100 of the present invention. More specifically, FIG. 9 illustrates the use of a computer's main memory 26 and external DASD 28. Within the computer's main memory 26 is the coordinating program 160 which controls the hook setup logic 162, SVC screening table 200, the open hook logic routines 164 as well as the replacement read routine 166 and attach RDBMS load utility routine 168. Also preferably residing within the computer's main memory 26 is the RDBMS load utility 40 itself which includes the necessary input file DCB 170, input file buffers 172, open SVC for input file DCB 174 and the read call for the input file DCB 176. Application data 12 is also graphically shown which, as described above, is formatted and then moved or copied to the input file buffers 172.

Sample code for updating open DCB in accordance with the present invention is shown below:

Updating Open DCB
Find out the DD name of the open DCB
Based on the DD name being processed, get the address of the appropriate replacement check routine, which varies depending on the DD name
Replace standard DCB check routine address with the replacement check routine address
Replace standard DCB read/write routine address with the generic replacement read/write routine address
Set up storage so check routine will be positioned for first read In general, method of loading data into a database of the present invention, includes the following steps:

a) a coordinating program 160 is run which is responsible for the coordination of transferring data from the computer's main memory 26 (application memory) to the RDBMS's load utility buffers 172. The data 12 from the application memory is formatted into the syntax of the load utility 40 prior to the transfer. This program calls the load utility 40 directly. After the load utility 40 terminates, control returns to this program;

b) the coordinating program 160 of Step a) sets up the proper operating system constructs to intercept the load utility calls to the operating system to open any of its input files;

c) upon interception of the operating system calls, the coordinating program 160 issues the real operating system call to open the files and then replaces the input routine provided by the operating system by a replacement input routine 34 that reads data from application memory 26. The replacement input routine 34 is used in place of the one provided by the operating system; and d) when the RDBMS's load utility 40 requests data from its input file(s), the replacement input routine 34 inserted by the coordinating program 160 gains control and transfers data from the application memory 26 to the buffers 172 allocated for the input files of the RDBMSs.

Record data input request from external media 28 are replaced with record data input requests from the computer's main memory. Record data from the computer's main memory 26 is inserted directly into the database tables 14 by the load utility 40. As a result, delays encountered by reading of input files on the external media 28 by the load utility 40 is avoided thereby making the bulk loading of data into a database more efficient by reducing load time and freeing up computer resources. The method 100 of the present invention has been tested to eliminate 70% of the elapsed time and CPU time required with prior art SQL INSERT statements.

It would be appreciated by those skilled in the art that various changes and modifications can be made to the illustrated embodiments without departing from the spirit of the present invention. All such modifications and changes are intended to be covered by the appended claims.

What is claimed is:

1. A method of loading data into a database, comprising the steps of:
   providing an operating system and access method for a record data;

providing a default input routine by the access method for the operating system;
providing a database capable of having record data loaded therein;
providing a computer's main memory;
providing an application data section in the computer's main memory;
providing an input buffer section in the computer's main memory;
providing record data for loading into the database; the record data residing in the computer's main memory;
invoking a coordinating program;
invoking a load utility program that issues record data input requests, opens record data from external media and loads record data to the database therefrom; the load utility having a required syntax;
with the coordinating program, intercepting record data input requests from external media made by the load utility program;
replacing the record data input request from external media with record data input requests from the computer's main memory;
formatting the record data to the syntax required by the load utility;
moving formatted record data from the application data memory section to the input buffer section, for later processing by the load utility;
inserting record data from computer's main memory directly into the database by the load utility; and
whereby delays encountered by reading of input files on the external media by the load utility is avoided.

2. The method of claim 1, further comprising the steps of:
providing record data in the application data memory section;
moving record data in the application data section to the input buffer section of file computer's main memory by the load utility; and
inserting record data from the input buffer section of the computer's main memory directly into the database.

3. The method of claim 1, further comprising the steps of:
providing record data in the application data memory section;
copying record data in the application data section to the input buffer section of the computer's main memory by the load utility; and
inserting record data from the input buffer section of the computer's main memory directly into file database.

4. A method of loading data into a database, comprising the steps of:
providing an operating system and access method for a record data;
providing a default input routine by the access method for the operating system;
providing a database capable of having record data loaded therein;
providing a computer's main memory;
providing an application data section in the computer's main memory;
providing an input buffer section in the computer's main memory;
providing record data for loading into the database; the record data residing in the computer's main memory;
invoking a coordinating program;
invoking a load utility program that issues record data input requests, opens record data from external media and loads record data to the database therefrom; the load utility having a required syntax;
with the coordinating program, intercepting record data input requests from external media made by the load utility program;
replacing the record data input request from external media with record data input requests from the computer's main memory;
formatting the record data to the syntax required by the load utility;
coving formatted record data from the application data memory section to the input buffer section, for later processing by the load utility;
inserting record data from computer's main memory directly into the database by the load utility; and
whereby delays encountered by reading of input files on the external media by the load utility is avoided.

5. The method of claim 4, further comprising the steps of:
providing record data in the application data memory section;
moving record data in the application data section to the input buffer section of file computer's main memory by the load utility; and
inserting record data from the input buffer section of the computer's main memory directly into the database.

6. The method of claim 4, further comprising the steps of:
providing record data in the application data memory section;
copying record data in the application data section to the input buffer section of the computer's main memory by the load utility; and
inserting record data from the input buffer section of the computer's main memory directly into file database.

* * * * *